US011866968B2

(12) United States Patent
Doring et al.

(10) Patent No.: US 11,866,968 B2
(45) Date of Patent: Jan. 9, 2024

(54) TIE BAR AND GUIDE FOR CASEMENT WINDOW

(71) Applicant: Truth Hardware Corporation, Owatonna, MN (US)

(72) Inventors: Craig Doring, Owatonna, MN (US); Zach Pennaz, Owatonna, MN (US); Douglas Nolte, Owatonna, MN (US)

(73) Assignee: Truth Hardware Corporation, Owatonna, MN (US)

( * ) Notice: Subject to any disclaimer, the term of this patent is extended or adjusted under 35 U.S.C. 154(b) by 752 days.

(21) Appl. No.: 17/024,111

(22) Filed: Sep. 17, 2020

(65) Prior Publication Data

US 2021/0102417 A1 Apr. 8, 2021

Related U.S. Application Data

(60) Provisional application No. 62/901,716, filed on Sep. 17, 2019.

(51) Int. Cl.
*E05C 9/20* (2006.01)
*E05C 1/00* (2006.01)
(Continued)

(52) U.S. Cl.
CPC ................ *E05C 9/20* (2013.01); *E05C 1/006* (2013.01); *E05C 9/006* (2013.01); *E05C 9/02* (2013.01);
(Continued)

(58) Field of Classification Search
CPC ........... Y10T 292/096; Y10T 292/0821; Y10T 292/08582; Y10T 292/0856;
(Continued)

(56) References Cited

U.S. PATENT DOCUMENTS 1,385,102 A 7/1921 Winters et al.
2,548,578 A 4/1951 Andersson et al.
(Continued)

FOREIGN PATENT DOCUMENTS

AT 11492 U1 * 9/2010
AU 2009201446 A1 * 10/2009 ......... E05B 65/0858
(Continued)

*Primary Examiner* — Kristina R Fulton
*Assistant Examiner* — Steven A Tullia
(74) *Attorney, Agent, or Firm* — Bradley J. Thorson

(57) ABSTRACT

A tie bar and guide assembly for casement windows having a roll form tie bar that snaps on to the tie bar guide without extending through it. The tie bar has locating openings that engage tabs on the tie bar guide to locate and secure the guide prior to installation. The tabs are depressed and disengaged when fasteners are used to secure the tie bar assembly to the window frame. The tie bar can include rivet locking points located close to the top and bottom of the tie bar to provide better security and increased stability for preventing water and air infiltration. The rivet locking points can be adjustable to optimize the fit of the window sash within the frame. The snap-on design reduces the overall height of the tie bar assembly thereby enabling a closer fit of the sash within the frame and reducing the required width of the window frame needed to accommodate the locking mechanism.

14 Claims, 6 Drawing Sheets

(51) Int. Cl.
*E05C 9/00* (2006.01)
*E05C 9/02* (2006.01)
*E05C 9/22* (2006.01)

(52) U.S. Cl.
CPC ........... *E05C 9/22* (2013.01); *E05Y 2600/314* (2013.01); *E05Y 2600/41* (2013.01); *E05Y 2600/45* (2013.01); *E05Y 2900/148* (2013.01)

(58) Field of Classification Search
CPC ........... Y10T 292/0859; Y10T 292/086; Y10T 292/0867; E05C 9/20; E05C 9/006; E05C 9/02; E05C 9/22; E05C 1/006; E05C 9/008; E05C 9/028; E05Y 2600/314; E05Y 2600/41; E05Y 2600/45; E05Y 2600/148; E05B 17/0012; E05B 15/0053; E05B 15/008
USPC .................... 292/308, 309; 49/394, 395, 192
See application file for complete search history.

(56) References Cited

U.S. PATENT DOCUMENTS

| | | | | | |
|---|---|---|---|---|---|
| 2,772,447 | A | | 12/1956 | Preston | |
| 2,866,238 | A | | 12/1958 | Lamb | |
| 2,924,476 | A | | 2/1960 | Deane | |
| 3,949,525 | A | | 4/1976 | Bates et al. | |
| 4,059,298 | A | | 11/1977 | Van Klompenburg | |
| 4,148,106 | A | | 4/1979 | Gallien | |
| 4,429,910 | A | | 2/1984 | Anderson | |
| 4,602,457 | A | | 7/1986 | Kreusel | |
| 4,621,847 | A | | 11/1986 | Paulson et al. | |
| 4,739,583 | A | | 4/1988 | Tonsmann et al. | |
| 4,803,808 | A | * | 2/1989 | Greisner | E05C 9/025 292/9 |
| 4,980,946 | A | | 1/1991 | Versani et al. | |
| 4,991,886 | A | | 2/1991 | Nolte et al. | |
| 5,045,265 | A | | 9/1991 | Pettit | |
| 5,118,145 | A | | 6/1992 | Tucker | |
| 5,165,741 | A | | 11/1992 | Everett | |
| 5,203,597 | A | | 4/1993 | Wheelock | |
| 5,318,333 | A | | 6/1994 | Dreifert et al. | |
| 5,370,428 | A | * | 12/1994 | Dreifert | E05B 63/0052 292/161 |
| 5,603,538 | A | | 2/1997 | Evers | |
| 5,642,909 | A | | 7/1997 | Swan et al. | |
| D388,689 | S | | 1/1998 | Bauman et al. | |
| D390,445 | S | | 2/1998 | Johnson et al. | |
| 5,730,477 | A | * | 3/1998 | Nagy | E05C 9/22 292/DIG. 20 |
| 5,741,031 | A | | 7/1998 | Bauman et al. | |
| 5,778,602 | A | | 7/1998 | Johnson et al. | |
| 5,839,767 | A | | 11/1998 | Piltingsgrud | |
| 5,927,767 | A | | 7/1999 | Smith et al. | |
| 6,135,511 | A | | 10/2000 | Smith et al. | |
| 6,161,881 | A | | 12/2000 | Babka et al. | |
| 6,367,853 | B1 | * | 4/2002 | Briggs | E05C 9/025 74/544 |
| 6,477,810 | B2 | | 11/2002 | Van De Keuken | |
| 6,651,389 | B2 | | 11/2003 | Minter et al. | |
| 6,837,004 | B2 | | 1/2005 | Annes | |
| 7,004,515 | B2 | | 2/2006 | Timothy | |
| 7,014,227 | B2 | | 3/2006 | Strangward et al. | |
| 7,219,469 | B2 | | 5/2007 | DiFrancesco | |
| 7,340,860 | B2 | | 3/2008 | Balbo Di Vinadio | |
| 7,452,014 | B2 | | 11/2008 | Vetter | |
| 7,617,707 | B2 | | 11/2009 | Chiang | |
| 7,624,539 | B2 | | 12/2009 | Speyer et al. | |
| 7,627,987 | B2 | | 12/2009 | Thielmann et al. | |
| 7,665,245 | B2 | | 2/2010 | Speyer et al. | |
| 7,685,774 | B2 | | 3/2010 | Thielmann | |
| 7,685,775 | B2 | | 3/2010 | Speyer et al. | |
| 7,685,776 | B2 | | 3/2010 | Speyer et al. | |
| 7,707,773 | B2 | | 5/2010 | Thielmann et al. | |
| 7,708,322 | B2 | * | 5/2010 | Timothy | E05C 9/063 292/DIG. 20 |
| 7,823,935 | B2 | * | 11/2010 | Norris | E05C 9/22 292/DIG. 20 |
| 7,946,633 | B2 | | 5/2011 | Minter | |
| 8,333,413 | B2 | | 12/2012 | Bourgoin et al. | |
| 8,353,541 | B2 | * | 1/2013 | Minter | E05C 9/1808 292/137 |
| 8,448,996 | B2 | * | 5/2013 | Lake | E05C 9/02 292/DIG. 7 |
| 8,640,384 | B2 | | 2/2014 | Curtis | |
| 9,151,094 | B2 | * | 10/2015 | Lambertini | E05C 9/02 |
| 9,175,506 | B2 | * | 11/2015 | Bauman | E05C 3/004 |
| 9,181,746 | B2 | * | 11/2015 | Nguyen | E05C 9/1808 |
| 9,217,266 | B2 | | 12/2015 | Bauman | |
| 10,012,016 | B2 | * | 7/2018 | Li | E06B 3/36 |
| 10,337,219 | B2 | * | 7/2019 | Wolf | E05C 9/041 |
| 2007/0000293 | A1 | | 1/2007 | Daniels et al. | |
| 2008/0016773 | A1 | * | 1/2008 | Di Vinadio | E05C 9/006 49/192 |
| 2008/0016782 | A1 | * | 1/2008 | Balbo Di Vinadio | E05C 9/006 49/192 |
| 2012/0146342 | A1 | * | 6/2012 | Bauman | E05C 19/00 292/138 |
| 2016/0130847 | A1 | * | 5/2016 | Gramstad | E05C 9/1833 49/394 |
| 2018/0058118 | A1 | * | 3/2018 | Minter | E05C 9/1808 |

FOREIGN PATENT DOCUMENTS

| | | | | | |
|---|---|---|---|---|---|
| CA | 2 364 823 | A1 | | 6/2002 | |
| CA | 2197845 | C | * | 5/2007 | E05C 9/021 |
| CA | 2977668 | A1 | * | 2/2018 | E05C 9/028 |
| DE | 4207345 | A1 | * | 9/1993 | E05C 17/16 |
| DE | 19709283 | C2 | * | 2/1999 | |
| DE | 10012735 | A1 | * | 9/2001 | |
| DE | 10140567 | A1 | * | 2/2003 | |
| DE | 60104460 | T2 | * | 8/2005 | |
| DE | 202005009745 | U1 | * | 12/2006 | E05C 9/20 |
| DE | 202011108844 | U1 | * | 5/2013 | |
| DE | 202013100319 | U1 | * | 6/2014 | |
| DE | 102015206906 | A1 | * | 10/2016 | |
| EP | 0620344 | A1 | * | 1/1994 | E05C 9/20 |
| EP | 0711894 | A2 | * | 9/1995 | E05C 9/20 |
| EP | 0943767 | A2 | * | 3/1999 | |
| EP | 1635019 | A2 | * | 3/2006 | E05C 9/24 |
| EP | 1867821 | A1 | * | 12/2007 | E05C 9/006 |
| EP | 1975353 | A1 | * | 10/2008 | E05C 9/1858 |
| EP | 2273047 | A2 | * | 1/2011 | |
| EP | 3162995 | A1 | * | 5/2017 | E05C 9/185 |
| EP | 3246499 | A1 | * | 11/2017 | E05C 9/1858 |
| GB | 2135374 | A | * | 8/1984 | E05D 15/5208 |
| GB | 2246807 | A | * | 2/1992 | E05B 17/2088 |
| GB | 2261697 | A | * | 5/1993 | E05C 9/02 |
| GB | 2332700 | A | * | 6/1999 | |
| GB | 2384816 | A | * | 8/2003 | |
| GB | 2484413 | A | * | 4/2012 | |
| GB | 2513121 | A | * | 10/2014 | |
| GB | 2525615 | A | * | 11/2015 | |
| GB | 2544255 | A | * | 5/2017 | E05C 9/004 |
| GB | 2546332 | A | * | 7/2017 | E05B 15/0006 |
| GB | 2567576 | B | * | 7/2019 | E05C 9/006 |
| JP | 02204588 | A | * | 1/1989 | E05D 15/52 |
| WO | WO-2010049750 | A1 | * | 5/2010 | E05C 9/02 |

* cited by examiner

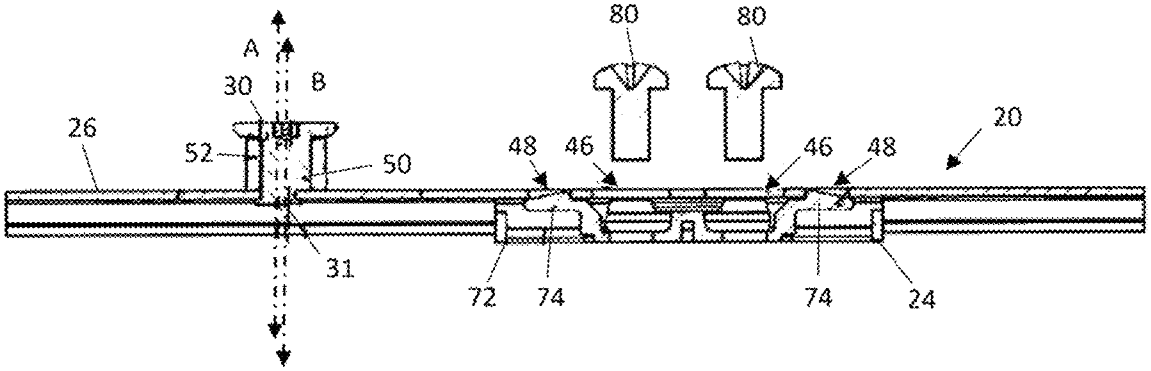
*Fig. 3a*
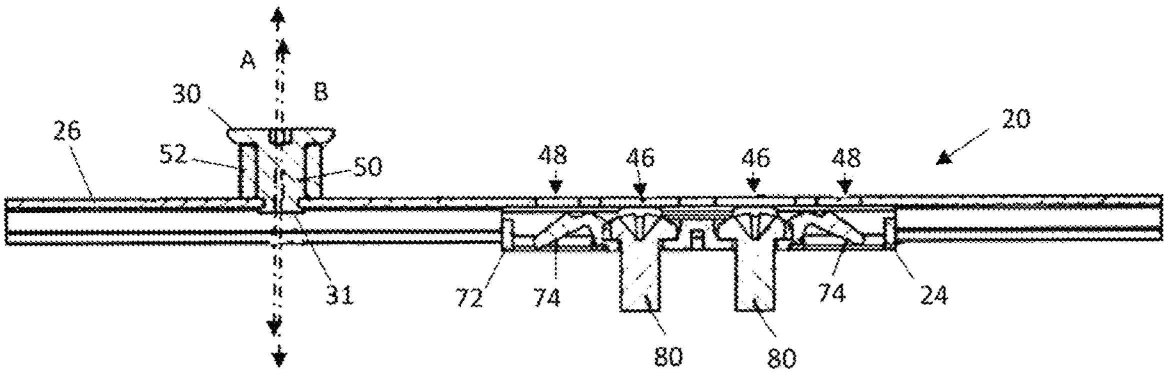
*Fig. 3b*
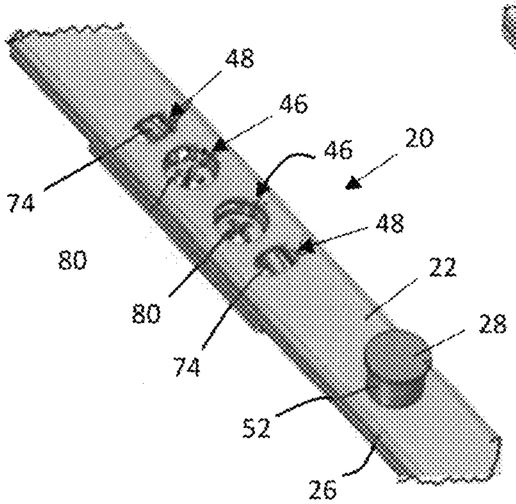
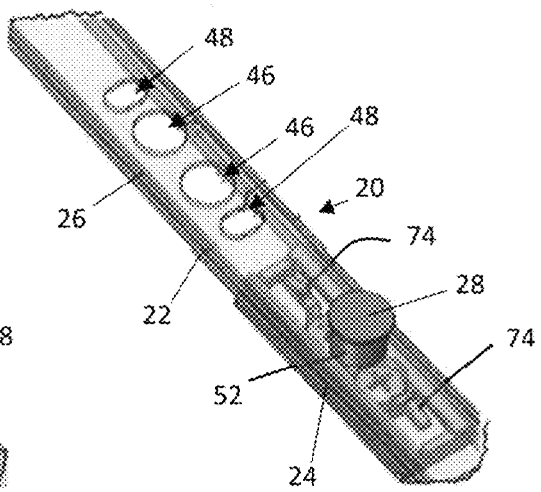
*Fig. 4a*
*Fig. 4b*

TIE BAR AND GUIDE FOR CASEMENT WINDOW

RELATED APPLICATION

The present application claims the benefit of U.S. Provisional Application No. 62/901,716, filed Sep. 17, 2020, said application being hereby incorporated herein in its entirety by reference.

TECHNICAL FIELD

The present invention relates to locks for casement windows, and more specifically to tie bars for casement window lock mechanisms.

BACKGROUND

Multi point sash lock systems for casement windows are well known and are commonly provided for security and to inhibit water entry and air infiltration in the window. These systems typically have a single operating control, usually a lever. The operating control is linked to a tie bar mounted on the window frame that allows activation of remote locking points in addition to the main locking point. Operation of the lever causes the tie bar to move longitudinally, usually vertically along the long axis of the window, so that locking points on the tie bar engage keepers on the sash to inhibit opening of the sash. Tie bar guides are used to secure the tie bar to the frame of the window, preventing transverse movement of the tie bar while permitting the tie bar to move longitudinally.

Increasingly, sell-locating tie bar guides are utilized when tie bars are installed in casement windows. Self-locating tie bar guides simplify the construction and assembly of casement windows and doors. Self-locating tie bar guides are prepositioned at desired locations along the length of the tie bar until they are secured, typically by screws, to the sash, window frame or door. Self-locating tie bar guides eliminate the need to either pre-drill holes that locate the guide securing screws or to build jigs or fixtures to hold the guides in place during the assembly process. They thus facilitate and speed assembly of the locking mechanism with the window or door. They also prevent the guides from sliding off the tie bar prior to assembly.

There are several prior-art tie bar systems that have self-locating tie bar guides. Self-locating tie bar guides are positioned along the tie bar at predefined locations and are secured to the tie bar in such a way as to stay in position until the tie bar guides are secured to the sash and the mechanism is operated.

Some commonly used prior art self-locating tie bar guides include a tab, pin, or some other feature that is frangible and that is broken off when the lock is operated for the first time and the tie bar is moved longitudinally. Others have a detent feature that is engaged and disengaged every time the lock is operated. Still others have a locating feature that moves upon installation. Each of these designs has certain short comings.

In systems that require a feature to be broken with the first operational cycle of the lock, the lock can be difficult to operate on the first cycle because sufficient force must be applied to sever the frangible feature. This is especially true when multiple locking points are used. Very often, the first operator of the lock is a homeowner. Homeowners commonly assume that there is something wrong with the window when it is difficult to operate the lock mechanism the first time. Alternately, they may believe that a part of the lock mechanism not intended to break has been broken when they initially operate the lock. This can lead to increased warranty claims and dissatisfaction on the part of the homeowner.

An additional concern that arises with systems that have a frangible feature, is that a broken off piece, when it is separated, can become free and lodge in some moving part of the lock mechanism. This can cause binding, noise or other problems which can also lead to increased warranty claims and homeowner dissatisfaction.

In the case of systems that have a permanent detent feature which engages and disengages every time the lock is operated, the detent can be felt every time the locked is cycled. This prevents smooth operation of the lock hardware.

One example of prior art breakaway pin designs includes a tab on a plastic tie bar guide that engages in a notch on the steel tie bar to position the guide. The tab breaks away when the lock is first cycled. Another example of a prior art tie bar system uses a small tab to hold a t-shaped guide into a c-shaped tie bar. When the tie bar guide is secured with a screw, a shoulder of the mounting screw pushes the location tab into a recess in the tie bar guide. This allows the tie bar to slide freely once installed.

Another prior art approach uses a leg with a post that fits into a hole in the tie bar guide. When the lock is first cycled, the post is forced out of the hole by movement of the tie bar and forces the leg upward. This causes the leg to yield or break at a weak point built into the leg. After the material of the leg has yielded, there is no downward pressure on the post and the post does not reengage into the hole, thereby freeing the tie bar for use. Another prior art device includes a dual tie bar guide with a breaking tab. The tab is fastened to the tie bar at a lock roller rivet. When the lock is operated for the first time, two small attachment points break allowing the tie bar to travel freely. The tab remains attached to the tie bar.

All of these prior art designs involve the tie bar extending through an aperture in the guide. Because the guide has portions surrounding the tie-bar, the installed height of the assembly—that is the dimension in which the assembly extends away from the frame is relatively large. The window frame profile must be designed to accommodate this large dimension, impairing the aesthetic appearance of the window and increasing the chance of water and air infiltration. Also, because the tie-bar extends through the guide, the locking points and guides must be located so that the locking points will not strike the guide when the tie bar is operated.

What is needed is a tie bar guide assembly for casement windows that addresses the shortcomings of prior devices.

SUMMARY

The present invention includes a tie bar and guide assembly that addresses the needs in the industry. A roll form tie bar is provided that snaps on to a tie bar guide without extending through it. The tie bar has locating openings that engage tabs on the tie bar guide to locate and secure the guide prior to installation. The tabs are depressed and disengaged when fasteners are used to secure the tie bar assembly to the window frame. The tie bar can include rivet locking points located close to the top and bottom of the tie bar to provide better security and increased stability for preventing water and air infiltration. The rivet locking points can be eccentrically shaped and can have features to enable selective fine adjustment to optimize the fit of the window sash within the frame. The snap-on design reduces the overall height of the tie bar assembly thereby enabling a closer fit of the sash within the frame and reducing the required width of the window frame profile. The tie bar can be roll formed from steel and openings can be cluster-punched to enable easy manufacture. In use, the lack of any portion of the guide extending over the tie bar on the side of the locking points enables the locking point to be positioned directly over the guide when the window is locked, adding strength to the assembly for better security.

Advantages of certain embodiments of the present invention include:

- Roll formed C-channel slides over the guide vs through the guide as in a conventional tie bar design;
- If the tie bar is formed from stainless steel only, no painted metal is necessary, thereby minimizing corrosion in use;
- Standardized hole patterns can optimize load performance;
- Lengths of the tie bar can be standardized, thereby reducing the number of different variations that need to be stocked;
- The top lock point can be moved closer to the head for improved air/water/structural performance;
- The strength of the bottom lock point is equivalent to other lock points—it is typically weaker in prior art designs;
- A standard hole pattern used for rivet and guide location allows for cluster punch in manufacturing, saving time and expense;
- When the lock is in the fully locked position, the lock point can be situated over the screw guide to maximize strength;
- The assembly can be prepared as a straight replacement for conventional tie-bars in existing vinyl window systems.
- The low-profile design enables use in wood frame window applications;
- The tie bar is non handed before guide is applied;
- The tie bar can be provided with ATC (around-the-corner) device connection capability;
- The guide can be pre-applied on the bar before shipment to a window manufacturer;
- A locating feature on the guide locates the guide during installation at the correct location for performance and proper mounting;
- The locating features are deflected during the process of installing the tie bar assembly on a window frame, avoiding the prior art device problem of debris from frangible locating features remaining in the mechanism to interfere with operation;
- The guide can be custom prepared to fit specific window profiles to locate the bar in an optimal location;
- The lower profile guide allows for a more aesthetic tie bar look with better keeper clearance;
- The wave-washer lock washer variant enables an eccentric sleeve rather than eccentric tenon on the rivet;
- An alternative embodiment has a roller enveloping eccentric sleeve to reduce friction;
- The eccentric sleeve can have a hex or lobed inner shape that engages similar shape on rivet holding the sleeve in place at specific adjustment locations;
- Embodiments with the wave spring washer hold the eccentric sleeve engaged to the mating rivet surfaces, holding the sleeve in the adjusted position;
- Pressing the sleeve axially away from rivet lobes enables the eccentric sleeve to be rotated to a different adjustment position;
- In other embodiments, coined bumps on tie bar or bumps on the rivet head engage voids in the eccentric sleeve to hold sleeve in any position. Adjustment is accomplished by rotating eccentric sleeve elastically over coined bumps until voids in eccentric sleeve align with a different coined bump on tie bar.

In embodiments of the invention, a casement window lock tie bar and guide assembly includes an elongate tie bar having a generally c-shaped cross-section defined by a top face, a pair of opposing sides, and a pair of projections, each projection extending inwardly from a separate one of the opposing sides, a plurality of spaced apart sets of apertures defined in the top face of the tie bar, each set of apertures including a pair of guide fastener apertures and a pair of locating apertures, the top face further defining a plurality of lock point apertures, each of the lock point apertures receiving a locking point, and a pair of guides, each guide including a body portion defining a pair of fastening holes, the body portion further including a pair of resilient tabs, each of the resilient tabs disposed adjacent a separate one of the fastening holes, the body portion having a pair of lateral edges, each lateral edge defining a groove receiving a separate one of the projections of the tie bar. When each guide is positioned on the tie bar so that the fastening holes of the guide are registered with the guide fastener apertures of one of the plurality of spaced apart sets of apertures defined in the tie bar, each resilient tab engages one of the locating apertures thereby preventing the tie bar from sliding on the guide. When the guide is attached to the frame of a casement window with a separate fastener extending through each of the fastening holes of the guide, the resilient tabs are disengaged from the locating apertures to enable the tie bar to slide on the guide.

In embodiments, the tie bar can be snapped onto the guides. The locking points can be rivets. In some embodiments each rivet has an eccentrically located shank, wherein the rivet is selectively rotatable relative to the tie bar, and wherein rotation of the rivet causes the locking point to shift laterally on the tie bar. In other embodiments, each rivet has an eccentric sleeve, wherein the sleeve is selectively rotatable on the rivet, and wherein rotation of the eccentric sleeve causes the locking point to shift laterally on the tie bar. Each rivet may have a roller sleeve over the eccentric sleeve, the roller sleeve rotatable on the eccentric sleeve.

In some embodiments, the body portion of the guide has a locating extension projecting from one of the lateral edges of the guide.

In further embodiments, a casement window assembly includes a easement window including a frame and a sash hinged to the frame, the sash being selectively shiftable relative to the frame to open and close an opening defined by the frame, the sash having a pair of keepers, and a tie bar and guide assembly disposed on the frame. The tie bar and guide assembly can include an elongate tie bar having a generally c-shaped cross-section defined by a top face, a pair of opposing sides, and a pair of projections, each projection extending inwardly from a separate one of the opposing sides, a plurality of spaced apart sets of apertures defined in the top face of the tie bar, each set of apertures including a pair of guide fastener apertures and a pair of locating apertures, the top face further defining a plurality of lock point apertures, each of the lock point apertures receiving a locking point, and a pair of guides, each guide including a body portion defining a pair of fastening holes, the body portion further including a pair of resilient tabs, each of the resilient tabs disposed adjacent a separate one of the fastening holes, the body portion having a pair of lateral edges, each lateral edge defining a groove receiving a separate one of the projections of the tie bar. When each guide is positioned on the tie bar so that the fastening holes of the guide are registered with the guide fastener apertures of one of the plurality of spaced apart sets of apertures defined in the tie bar, each resilient tab engages one of the locating apertures thereby preventing the tie bar from sliding on the guide, and wherein when the guide is attached to the frame of the casement window with a separate fastener extending through each of the fastening holes of the guide, the resilient tabs are disengaged from the locating apertures to enable the tie bar to be selectively slidable on the guides to engage and disengage the locking points from the keepers.

In some embodiments, the tie bar can be snapped onto the guides. The locking points may be rivets. Each rivet may have an eccentrically located shank, wherein the rivet is selectively rotatable relative to the tie bar, and wherein rotation of the rivet causes the locking point to shift laterally on the tie bar. In other embodiments, each rivet may have an eccentric sleeve, wherein the sleeve is selectively rotatable on the rivet, and wherein rotation of the eccentric sleeve causes the locking point to shift laterally on the tie bar. Each rivet may have a roller sleeve over the eccentric sleeve, the roller sleeve rotatable on the eccentric sleeve.

In embodiments, the body portion of the guide has a locating extension projecting from one of the lateral edges of the guide.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3*a* is a cross-sectional view of the tie bar assembly of FIG. 2 depicting the resilient tabs of the guide engaging locating apertures in the tie bar prior to installation;

FIG. 3*b* is a cross-sectional view of the tie bar assembly of FIG. 2 depicting the resilient tabs of the guide deflected by fasteners so as to disengage from the locating apertures in the tie bar after installation;

FIG. 4*a* is an isometric view depicting the tie bar assembly of FIG. 2 in a post-installation window-unlocked position after the resilient tabs have been deflected by fasteners to disengage from the tie bar;

FIG. 4*b* is a post-installation isometric view of FIG. 2 with the tie bar shown in phantom and the window in a locked position, showing that the locking point locates above the tie bar guide thereby enabling improved security;

Figure 1:
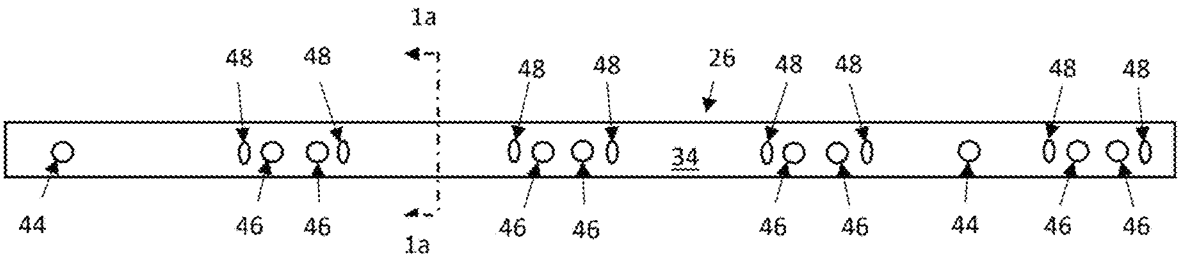
FIG. 1 is a top plan view of a roll form tie bar according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1A:
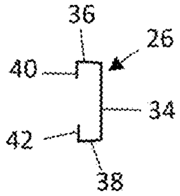
FIG. 1*a* is a cross-section of the tie bar of FIG. 1 taken at section 1*a*-1*a* of FIG. 1.

In FIGS. 1, 1*a*, and 2-14 there is depicted a tie bar and guide assembly 20 according to embodiments of the invention. Assembly 20 generally includes tie bar assembly 22 and guide 24. Tie bar assembly 22 generally includes roll-form tie bar 26 and rivet locking point 28. Roll-form tie bar 26 can be formed from stainless steel or other suitable metal and has a c-shaped cross-section as depicted in FIGS. 1 and 1*a* with planar top face 34, sides 36, 38, and inwardly directed projections 40, 42. Apertures can be formed through top face 34 via cluster punching or other suitable methods. These apertures can include lock point apertures 44, guide fastener apertures 46, and locating apertures 48. It will be appreciated that sets of guide fastener apertures 46 and locating apertures 48, and lock point apertures 44, may be disposed at standardized predetermined locations along the length of tie bar 26. This enables tie bar and guide assembly 20 to be manufactured in a limited number of variations while still fitting virtually all casement window sizes, thereby saving expense and effort.

Figure 1B:
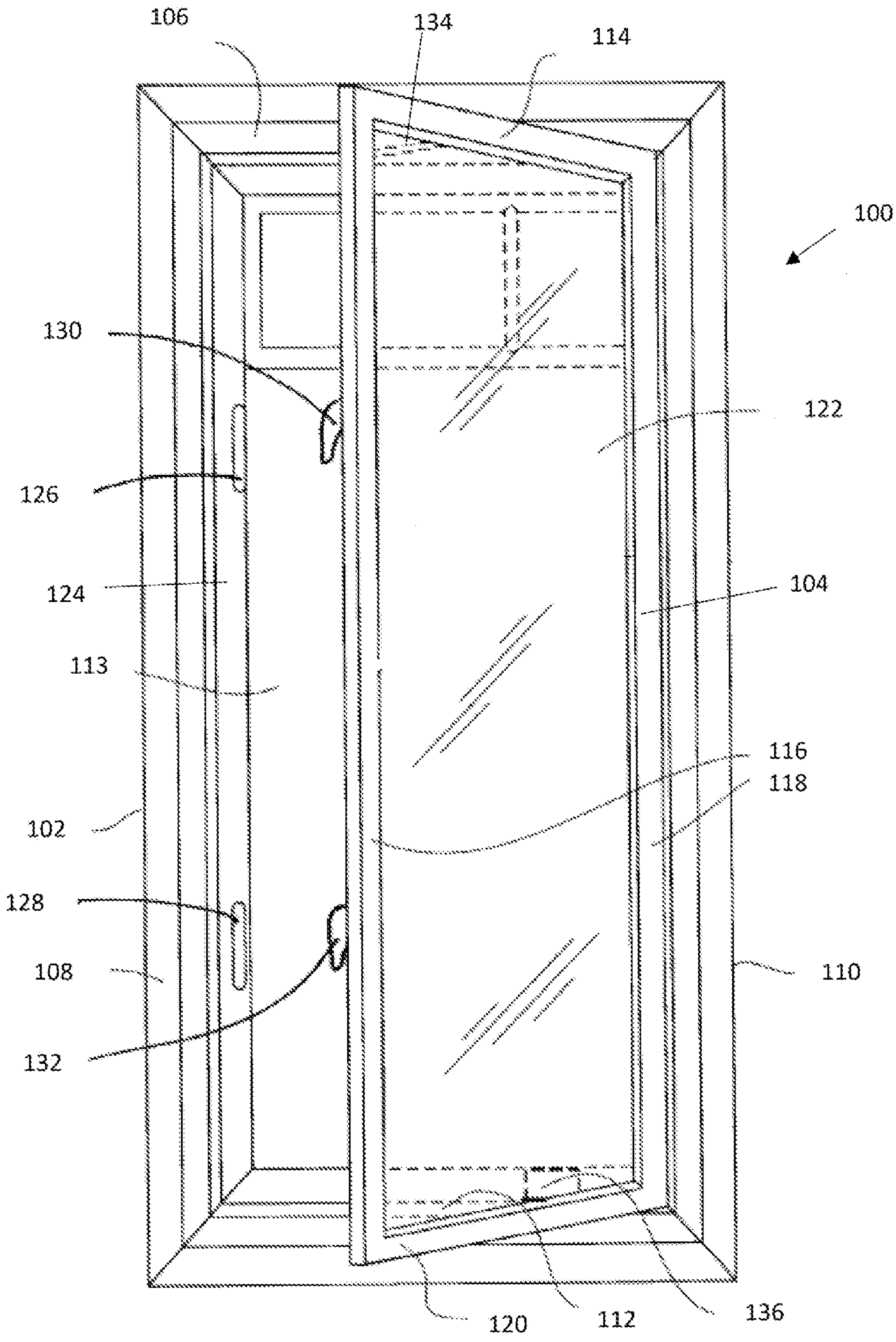
FIG. 1*b* is an elevation view of a easement window incorporating a tie bar and guide assembly according to embodiments of the invention.

FIG. 1*b* depicts a casement window 100 incorporating tie bar and guide assembly 20. Casement window 100 generally includes frame 102 and sash 104. Frame 102 generally includes top rail 106, side rails 108, 110, and bottom rail 112, and defines opening 113. Sash 104 generally includes top rail 114, side rails 116, 118, and bottom rail 120, receiving glass 122. Tie bar and guide assembly 20 is concealed inside enclosure 124, and is operated by a lever (not depicted).

Enclosure 124 defines openings 126, 128, for admitting keepers 130, 132 when sash 104 is closed to close opening 113. Sash 104 is hinged to frame 102 with hinges 134 at the top and bottom, and is operated to open and close with operator 136.

Figure 2:
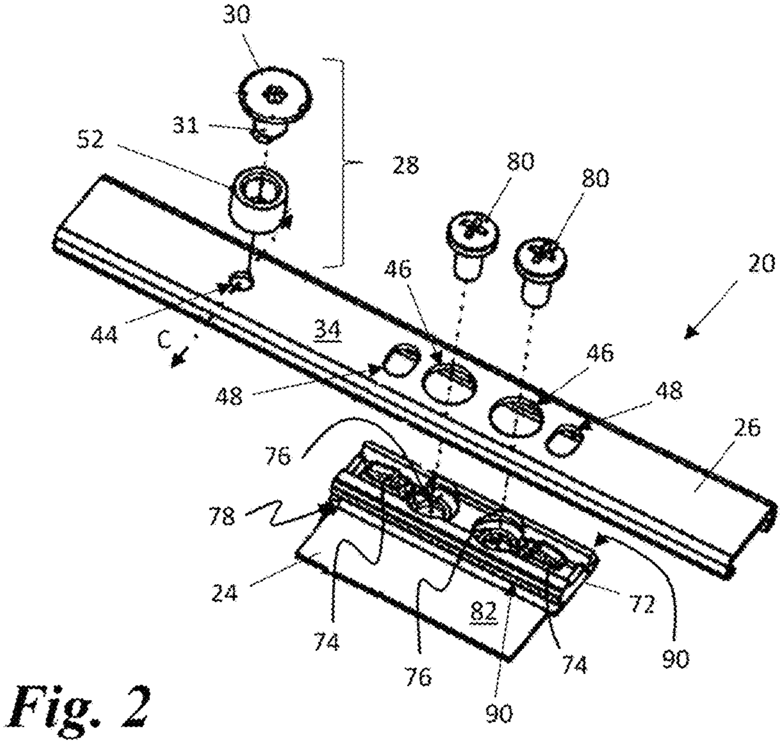
FIG. 2 is an isometric view of a tie bar and guide assembly according to an embodiment of the invention.

Rivet locking point 28 can include rivet 30 with an eccentrically located shank 31 as depicted in FIGS. 2-6, or a rivet 32 with a symmetrical cylindrical shank as depicted in FIGS. 7-11. In the embodiment of FIGS. 2-6, eccentrically located shank 31 is oriented about axis A, while main portion 50 is oriented about axis B which is offset from axis A as depicted in FIGS. 3*a* and 3*b*. Sleeve 52 is rotatably fitted on main portion 50. As rivet 30 is rotated about axis A, the location of rivet locking point 28 is shifted laterally generally parallel to axis C as depicted in FIG. 2 so as to engage and disengage keepers 130, 132, mounted on sash 104. Sleeve 52 rolls on main portion 50 as the rivet locking point 28 engages with the keeper so as to reduce friction.

Figure 7:
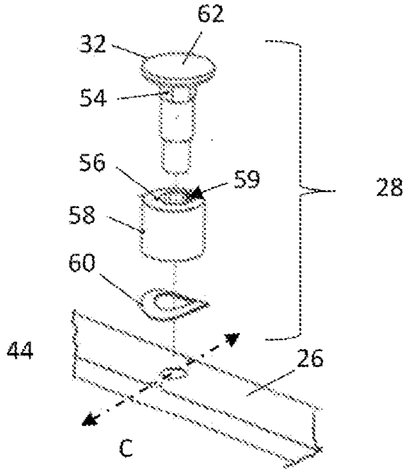
FIG. 7 is an exploded isometric view of an embodiment of an eccentric rivet locking point on the tie bar.
Figure 8:
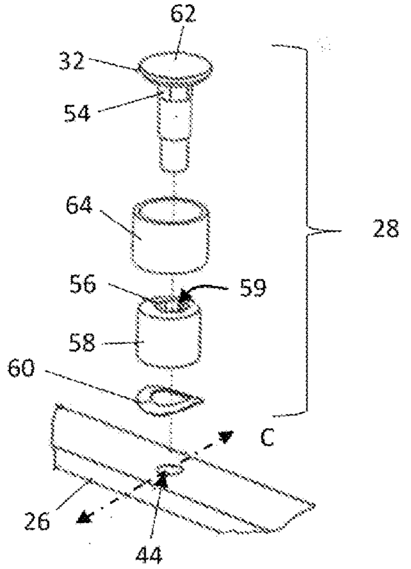
FIG. 8 is an exploded isometric view of another embodiment of an eccentric rivet locking point having a roller sleeve.

In the embodiments of FIGS. 7-8, rivet 32 has hexagonal flats 54 that engage conforming hexagonal aperture 56 in sleeve 58. Sleeve 58 has eccentrically located aperture 59. Spring washer 60 biases sleeve 58 toward head 62. As rivet 32 is rotated, the location of rivet locking point 28 is shifted laterally generally parallel to axis C due to eccentrically located aperture 59, so as to engage and disengage keepers 130, 132, mounted on sash 104. In the embodiment of FIG. 8, roller sleeve 64 is rotatably received on sleeve 58 so as to reduce rolling friction with the window sash keeper.

Figure 9:
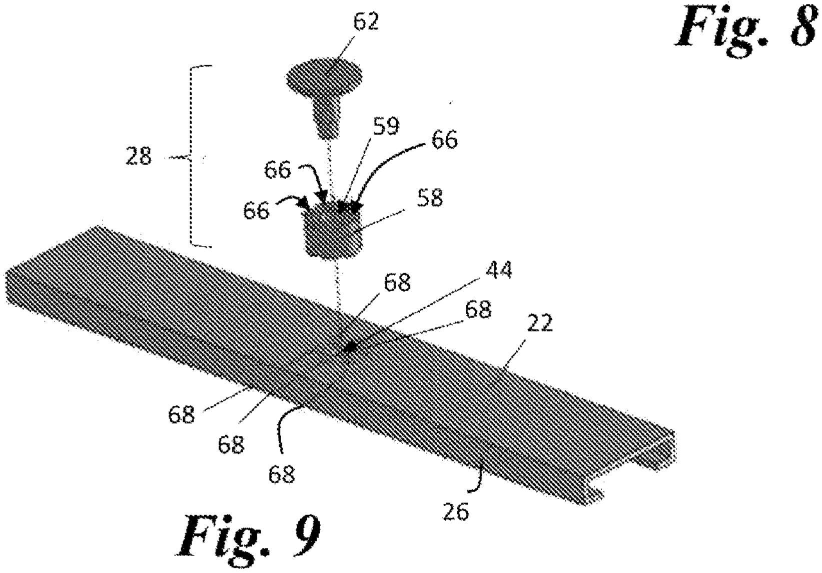
FIG. 9 is an exploded isometric view of another embodiment of an eccentric rivet locking point on the tie bar, wherein coined bumps on the tie bar and matching features on the sleeve enable rotation of the sleeve for adjustment in predetermined positions.
Figure 10:
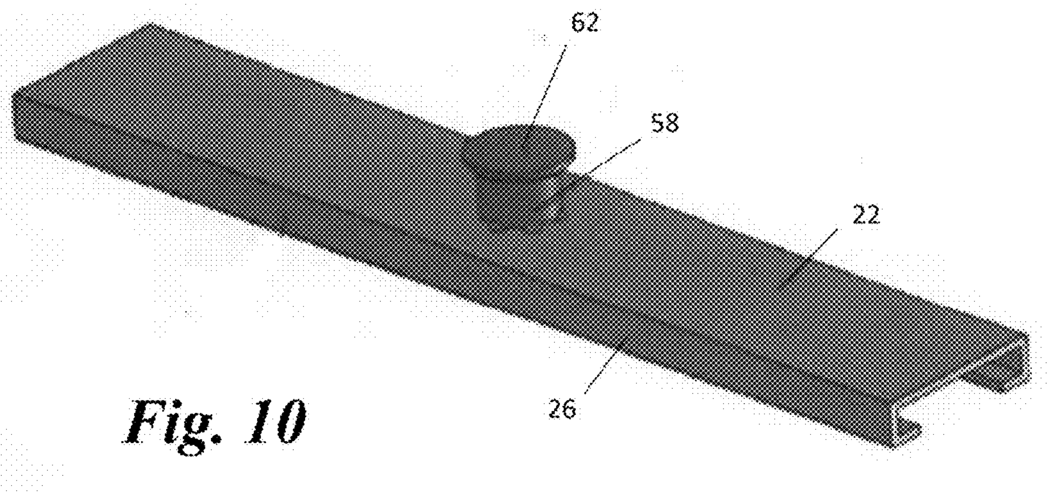
FIG. 10 is an isometric view of the rivet locking point of FIG. 9 in an assembled condition.

In the alternative embodiments of FIGS. 9-13, sleeve 58 has apertures 66 positioned about aperture 59. Apertures 66 could also be indentations that do not extend all the way through sleeve 58. In the embodiment of FIGS. 9 and 10 coined bumps 68 are formed on tie bar 22. As sleeve 58 and rivet 32 are rotated, coined bumps 68 engage apertures 66 to provide detents.

Figure 11:
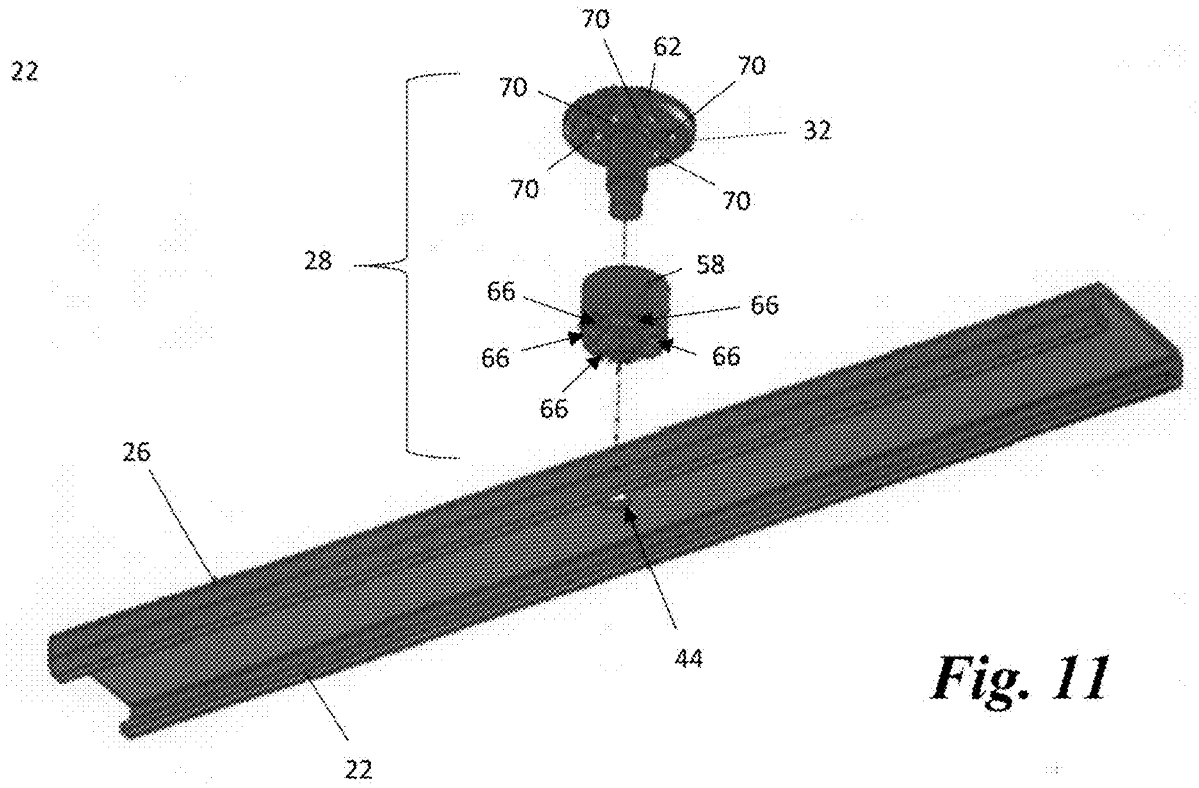
FIG. 11 is an exploded isometric view of another embodiment of an eccentric rivet locking point on the tie bar, wherein bumps on the mating surface of the sleeve enable rotation of the sleeve for adjustment in predetermined positions.
Figure 12:
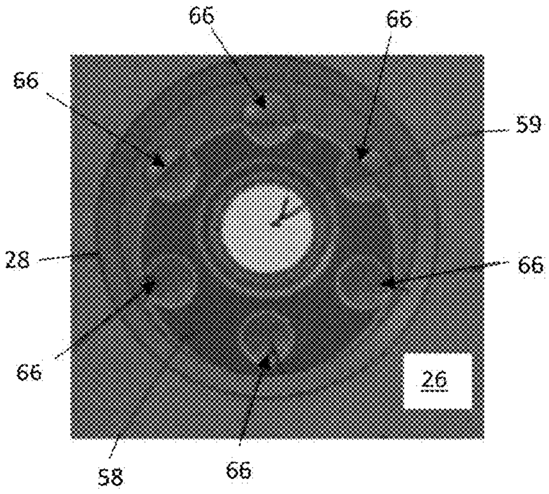
FIG. 12 is a top plan view of an eccentric rivet locking point sleeve in a first rotational position.
Figure 13:
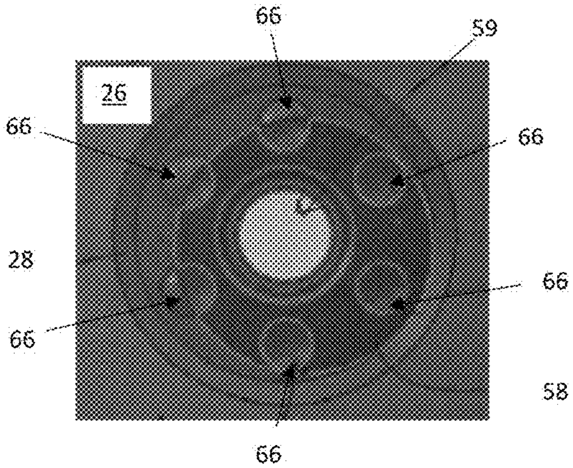
FIG. 13 is a top plan view of an eccentric rivet locking point sleeve in a second rotational position.
Figure 14:
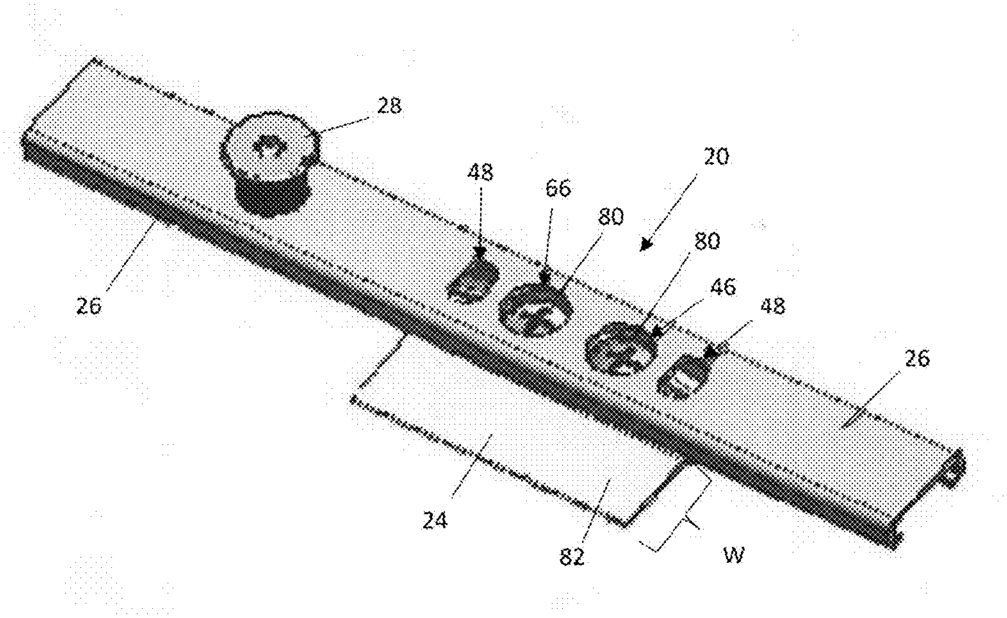
FIG. 14 is an isometric view of the tie bar assembly with the guide having a locating extension for locating the assembly on a window frame.

Instead of coined bumps 68 on tie bar 22, bumps 70 can be formed on the underside of head 62 that similarly engage, with apertures 66 as depicted in FIG. 11. As depicted in FIGS. 12-13, the bumps 68, 70, engage with apertures 66 to provide discrete detents for the rotational location of sleeve 58.

Figure 5:
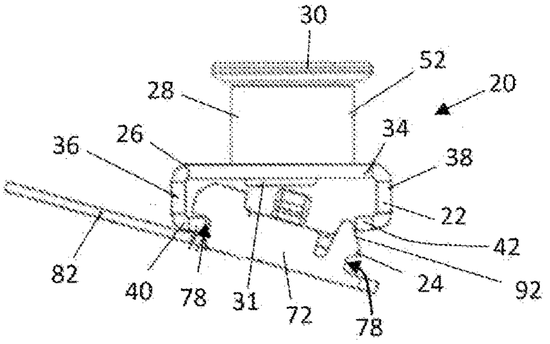
FIG. 5 is an end view of the tie bar assembly with the tie bar in position to snap on to the guide.

Guide 24 generally includes body portion 72, with resilient tabs 74 positioned adjacent fastening holes 76. Lateral grooves 78 are formed in the lateral edges 90 of guide 24 to receive projections 40, 42. Tie bar 22 can be snapped onto guide 24 as depicted in FIGS. 5 and 6 by advancing projection 40 into one of lateral grooves 78 and pressing down on tie bar 26 to enable projection 42 to slide over sloped portion 92 and engage with the other lateral groove 78.

Prior to installation on the casement window frame, tie bar 22 can be snapped onto guide 24 with tabs 74 engaged in locating apertures 48, thereby preventing guide 24 from sliding on tie bar 24. During installation, fasteners 80 are inserted through apertures 46 and holes 76 to secure guide 24 to the window frame. As fasteners 80 are tightened, tabs 74 are depressed so as to disengage from locating apertures 48 as depicted in FIGS. 3*a* and 3*b*. In the position of FIG. 3*b*, tie bar 22 can slide freely on guide 24. Locating extension 82 can be provided in various widths W to fit different window frame profiles. During installation, locating extension 82 can simply be butted against a facing surface of the window profile to precisely locate the assembly 20 on window frame 102 to properly engage keepers 130, 132. In addition, locking points 28 can be adjusted through the configurations described above to provide fine adjustment of sash engagement with the frame.

It will be appreciated that, as depicted in FIG. 4*b*, locking point 28 can slide over guide 24. In addition, tie bar and guide assembly 20 can be configured so that when the window is locked, locking point 28 is positioned directly over guide 24 as depicted. Security is improved over prior designs in which the locking point must be longitudinally displaced from the guide, since less bending load will be imparted to the tie bar upon any attempt to pry open the window. Also, locking points 28 can be located closer to the bottom and top of the window sash improving strength.

Figure 6:
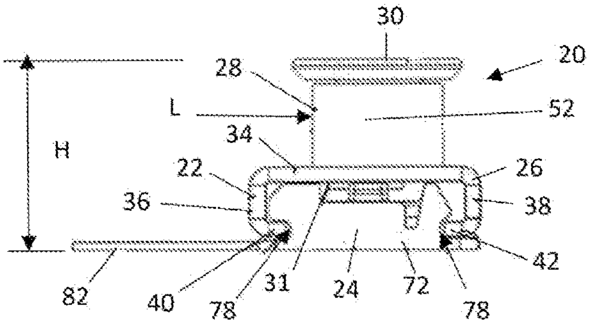
FIG. 6 is an end view of the tie bar assembly with the tie bar snapped on to the guide.

Further, as depicted in FIG. 6, the reduction in overall height H of tie bar and guide assembly 20 compared to prior art devices results in load L imposed from the sash keeper being closer to the window frame. This results in improved fit of the sash within the frame and improved strength and security. The lower height H also enables a narrower window frame profile, improving the aesthetic appearance of the window.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A casement window lock tie bar and guide assembly comprising:

an elongate tie bar having a generally c-shaped cross-section defined by a top face, a pair of opposing sides, and a pair of projections, each projection extending inwardly from a separate one of the opposing sides, a plurality of spaced apart sets of apertures defined in the top face of the tie bar, each set of apertures including a pair of guide fastener apertures and a pair of locating apertures, the top face further defining a plurality of lock point apertures, each of the lock point apertures receiving a locking point;

a pair of guides, each guide including a body portion defining a pair of fastening holes, the body portion further including a pair of resilient tabs, each of the resilient tabs disposed adjacent a separate one of the fastening holes, the body portion having a pair of lateral edges, each lateral edge defining a groove receiving a separate one of the projections of the tie bar;

wherein when each guide is positioned on the tie bar so that the fastening holes of the guide are registered with the guide fastener apertures of one of the plurality of spaced apart sets of apertures defined in the tie bar, each resilient tab engages one of the locating apertures thereby preventing, the tie bar from sliding on the guide, and wherein when the guide is attached to the frame of a casement window with a separate fastener extending through each of the fastening holes of the guide, the resilient tabs are disengaged from the locating apertures to enable the tie bar to slide on the guide.

2. The casement window lock tie bar and guide assembly of claim 1, wherein the tie bar can be snapped onto the guides.

3. The casement window lock tie bar and guide assembly of claim 1, wherein the locking points are rivets.

4. The casement window lock tie bar and guide assembly of claim 3, wherein each rivet has an eccentrically located shank, wherein the rivet is selectively rotatable relative to the tie bar, and wherein rotation of the rivet causes the locking point to shift laterally on the tie bar.

5. The casement window lock tie bar and guide assembly of claim 3, wherein each rivet has an eccentric sleeve, wherein the sleeve is selectively rotatable on the rivet, and wherein rotation of the eccentric sleeve causes the locking point to shift laterally on the tie bar.

6. The casement window lock tie bar and guide assembly of claim 5, wherein each rivet has a roller sleeve over the eccentric sleeve, the roller sleeve rotatable on the eccentric sleeve.

7. The casement window lock tie bar and guide assembly of claim 1, wherein the body portion of the guide has a locating extension projecting from one of the lateral edges of the guide.

8. A casement window assembly comprising:

a casement window including a frame and a sash hinged to the frame, the sash being selectively shiftable relative to the frame to open and close an opening defined by the frame, the sash having a pair of keepers;

a tie bar and guide assembly disposed on the frame, the tie bar and guide assembly comprising:

an elongate tie bar having a generally c-shaped cross-section defined by a top face, a pair of opposing sides, and a pair of projections, each projection extending inwardly from a separate one of the opposing sides, a plurality of spaced apart sets of apertures defined in the top face of the tie bar, each set of apertures including a pair of guide fastener apertures and a pair of locating apertures, the top face further defining a plurality of lock point apertures, each of the lock point apertures receiving a locking point;

a pair of guides, each guide including a body portion defining a pair of fastening holes, the body portion further including a pair of resilient tabs, each of the resilient tabs disposed adjacent a separate one of the fastening holes, the body portion having a pair of lateral edges, each lateral edge defining a groove receiving a separate one of the projections of the tie bar;

wherein when each guide is positioned on the tie bar so that the fastening holes of the guide are registered With the guide fastener apertures of one of the plurality of spaced apart sets of apertures defined in the tie bar, each resilient tab engages one of the locating apertures thereby preventing the tie bar from sliding on the guide, and wherein when the guide is attached to the frame of the casement window with a separate fastener extending through each of the fastening holes of the guide, the resilient tabs are disengaged from the locating apertures to enable the tie bar to be selectively slidable on the guides to engage and disengage the locking points from the keepers.

9. The casement window of claim 8, wherein the tie bar can be snapped onto the guides.

10. The casement window of claim 8, wherein the locking points are rivets.

11. The casement window of claim 10, wherein each rivet has an eccentrically located shank, wherein the rivet is selectively rotatable relative to the tie bar, and wherein rotation of the rivet causes the locking point to shift laterally on the tie bar.

12. The casement window of claim 10, wherein each rivet has an eccentric sleeve, wherein the sleeve is selectively rotatable on the rivet, and wherein rotation of the eccentric sleeve causes the locking point to shift laterally on the tie bar.

13. The casement window of claim 12, wherein each rivet has a roller sleeve over the eccentric sleeve, the roller sleeve rotatable on the eccentric sleeve.

14. The casement window of claim 8, wherein the body portion of the guide has a locating extension projecting from one of the lateral edges of the guide.

* * * * *